Jan. 1, 1963    H. L. GLAZE    3,071,349
HOIST

Filed Dec. 12, 1958    6 Sheets-Sheet 1

INVENTOR.
HERBERT L. GLAZE
BY
Christie, Parker & Hale
ATTORNEYS

Jan. 1, 1963  H. L. GLAZE  3,071,349
HOIST
Filed Dec. 12, 1958  6 Sheets-Sheet 2

INVENTOR.
HERBERT L. GLAZE
BY
*Christie, Parker & Hale*
ATTORNEYS

Jan. 1, 1963

H. L. GLAZE 3,071,349

HOIST

Filed Dec. 12, 1958

INVENTOR.
HERBERT L. GLAZE
BY
Christie Parker & Hale
ATTORNEYS

INVENTOR.
HERBERT L. GLAZE
BY Christie, Parker & Hale
ATTORNEYS

United States Patent Office 3,071,349
Patented Jan. 1, 1963

3,071,349
HOIST
Herbert L. Glaze, 10840 Plateau Drive, Sunland, Calif.
Filed Dec. 12, 1958, Ser. No. 780,055
4 Claims. (Cl. 254—186)

This invention relates to hoists and in one of its more particular aspects relates to portable, manually-operated hoists.

Hoists including portable hoists are presently employed in various types of manufacturing operations and are generally considered to be heavy duty machines. The considerations for portable hoists are generally similar to those required for large capacity, heavy duty machines, namely, a precise control for locating or positioning the load with a minimum of manual operation and effort. A manufacturing operation which exemplifies the precise control required of a hoist is in the manufacture of jet aircraft. During the manufacture of jet aircraft the assembled jet engine has to be installed in the aircraft and which jet engine generally has a plurality of pipes, fittings and the like extending outwardly therefrom. The body of the jet aircraft is also provided with similar pipes and fittings to receive the corresponding fittings to be connected to the aircraft. It is therefore necessary to position in some fashion the matching fittings adjacent one another to allow them to be connected together. This necessarily implies that the pipes or fittings must be positioned in substantial alignment with one another by some apparatus or machine, since the weight of the jet engine and aircraft prohibit manual manipulation or lifting of either. This operation is presently carried out by suspending the jet engines in the aircraft body by means of hoists and manually controlling the position of the engine relative to the aircraft body to properly locate the matching fittings. Even though present-day hoists are satisfactory, a large capacity, light-weight hoist offering even more precise control of the load and without resulting in any breakage of cable is desirable. It would be further advantageous that a hoist of this type be capable of operation by one man.

This invention provides an improved hoist which is of light weight construction and yet capable of lifting or hoisting heavy loads safely without any breakage of the lifting cable. The hoist is advantageously arranged to afford precise control of the load by manual operation of the hoist with a minimum of effort on the part of the operator. The hoist not only affords a high degree of control over the load being hoisted, but also is constructed and arranged to alternately and selectively allow an unloaded lifting cable to be quickly and easily raised or lowered. The hoist further includes in combination with the above features an automatically actuated brake having a response time consistent with the precise control provided for the load.

These features result in an improved hoist by the provision of a gear train arranged on a driven shaft for driving a hoist drum at a low velocity. The gear train is advantageously arranged as an epicyclic gear train freely rotatable in an internal gear. The internal gear is adapted to drive the hoist drum directly, affording a fast winding and unwinding of a lifting cable secured to the hoist drum. The internal gear further includes a control latch to lock and unlock it in a stationary position in accordance with the lifting action desired. The internal gear is latched or locked when it is desired to operate the hoist through the gear train. The hoist further includes an automatic or self-actuating brake arrangement mounted on the driven shaft to be responsive to the unwinding of the lifting cable as a result of the load acting thereon, and which brake operates on the driven shaft with a minimum time lag consistent with the control afforded by the gear train.

The epicyclic gear train is arranged as a reduction gear train comprising a plurality of reduction stages each including a central gear axially mounted on the driven shaft and with a plurality of gears spaced around the central shaft and meshing therewith and with the internal gear. The stages of the epicyclic gear train are adapted to be driven by the shaft through the brake and in turn drive the succeeding gear stage to drive the hoist drum when the internal gear is locked. The brake is mounted on the driven shaft and comprises a pair of brake discs spaced apart to clampingly receive a ratchet wheel therebetween. The ratchet wheel is provided with two friction discs for frictionally engaging the brake discs. The ratchet wheel further includes a restraining member mounted to control the direction of rotation of the ratchet wheel and which ratchet wheel is mounted on the shaft to rotate freely thereon so that the ratchet wheel rotates in only a preselected direction to prevent the unwinding of the lifting cable from the hoist drum. One of the brake discs is mounted on the driven shaft to rotate freely thereabout and includes an extension adapted to cooperate with a locking member fixed to the driven shaft. This locking action is preferably provided by a pair of similarly defined cams; one cam is arranged on the brake disc and the other comprises the locking member. This same brake disc is further arranged to receive an annular driving member for driving the shaft and thereby the gear train through the brake. The other brake disc is mounted to rotate with the driven shaft. Consistent with the precise control afforded by the gear train for the hoist, the manual operating means connected to the annular member may be provided with a ratchet to allow the driven shaft to be rotated in small increments without requiring the operating means to be rotated through a complete revolution. The hoist is, in this instance, further provided with an extension boom having a sheave arranged adjacent one end thereof to receive and pass a cable wound and unwound from the hoist drum.

These and other features of the present invention may be more fully appreciated when considered in the light of the following specification and drawings, in which.

As one embodiment of this invention the drawings show an improved hoist 10 including a hoist drum 11 arranged to be directly driven by an internal gear 12 or a gear train 13 mounted on a driven shaft 14. A brake 15 is axially spaced on the driven shaft 14 from the gear train 13 and which brake 15 is arranged with a crank 16 connected for driving the shaft 14 and thereby the hoist drum 11 through the gear train 13. The internal gear 12 is also adapted to be manually rotated through the provision of a crank 17 and which crank 17 includes latch 18 for locking and unlocking the internal gear in a stationary or non-rotatable position. The gear train 13 is freely rotatable within the internal gear 12 and the provision of the control latch 18 thereby allows the hoist drum 11 to be alternately and selectively controlled so as be rotatably driven at a relatively slow or fast rate through either the gear train 13 or the internal gear 12, respectively.

Figure 6:
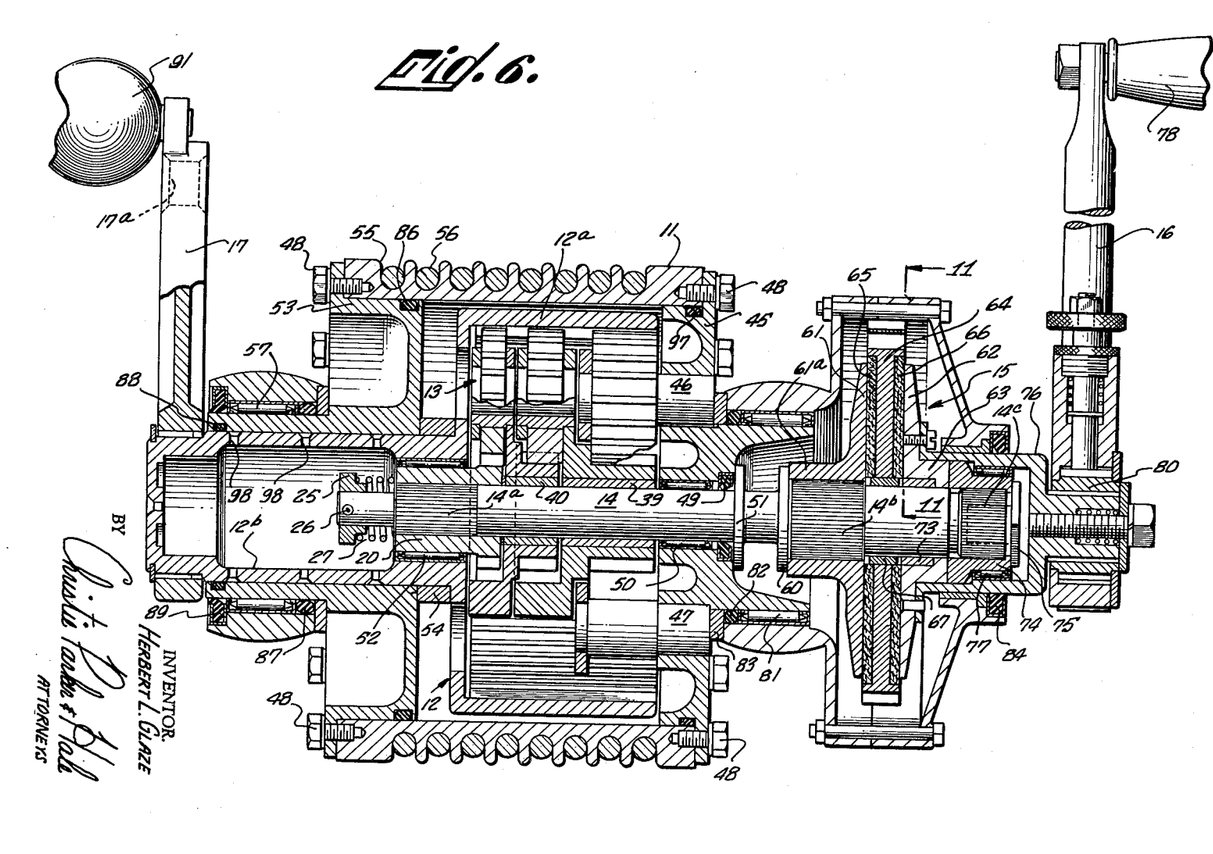
FIG. 6 is a cross-sectional view, with parts shown in elevation, of the control mechanism for the hoist.
Figures 7, 14:
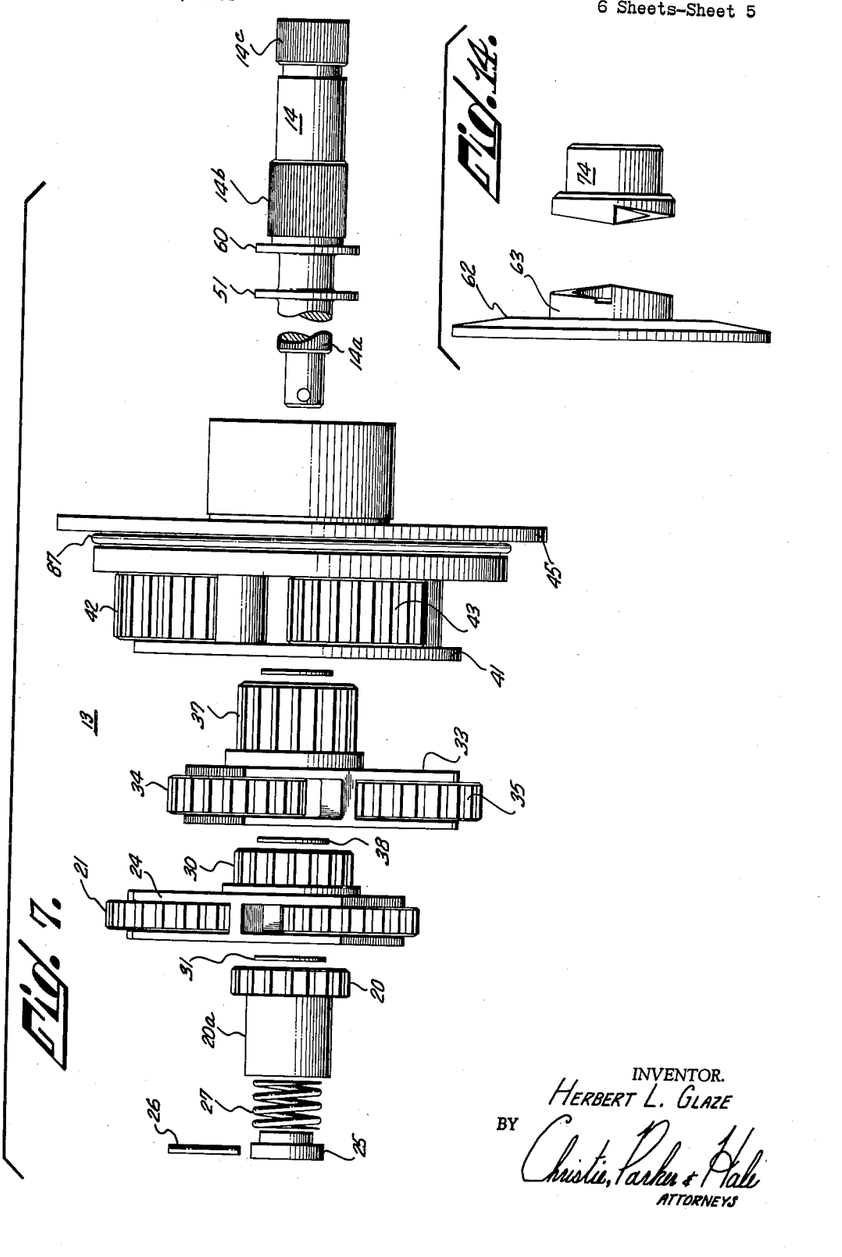
FIG. 7 is an exploded view of the epicyclic gear train shown in FIG. 6, with a portion of the shaft broken away.
FIG. 14 is a detached view of the brake disc and the brake cam shown in an exploded relationship.
Figures 8, 9, 11:
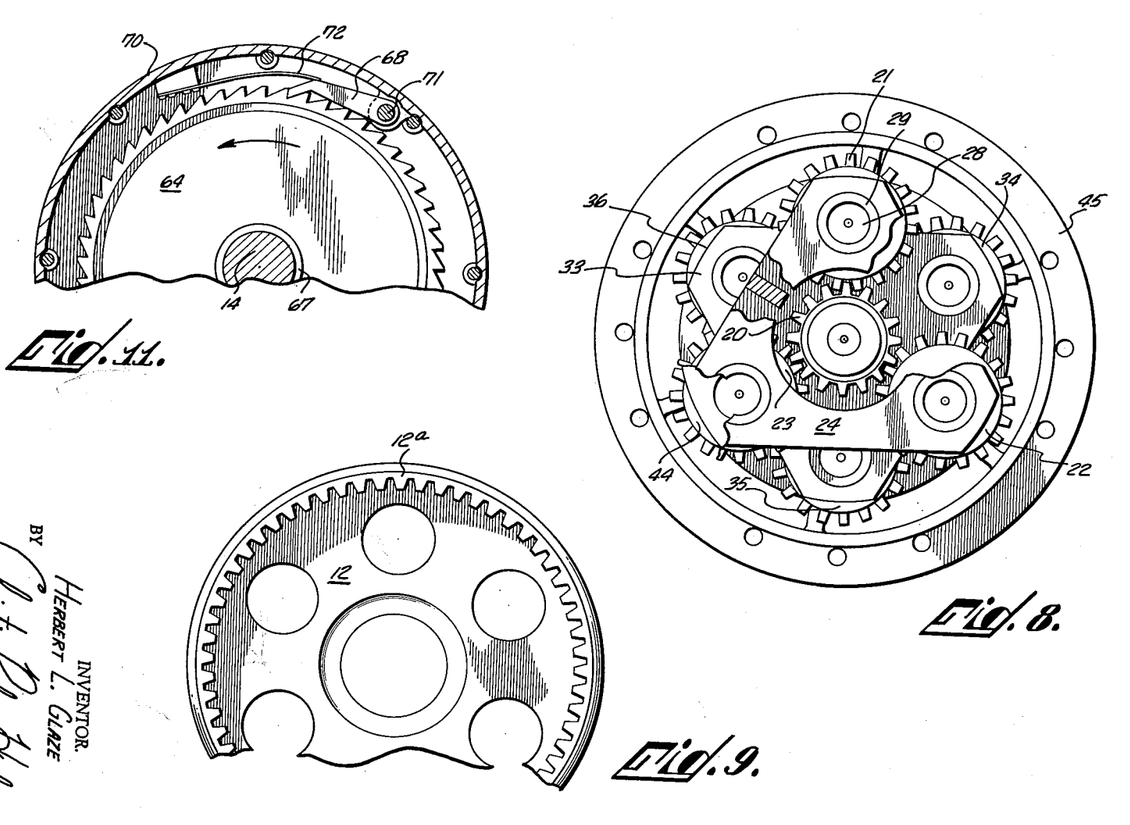
FIG. 8 is an end elevational view, partially in section, with portions broken away, of the assembled gear train of FIG. 7.
FIG. 9 is a partial elevational view of the internal gear shown in FIG. 6.
FIG. 11 is a partial sectional view of the brake assembly shown in FIG. 6, taken along the line 11—11.

The slower driving rate or precise control of the hoist drum 11 is afforded by the gear train 13 mounted adjacent one end of the driven shaft 14. The gear train 13 comprises a plurality of stages of epicyclic gear trains and which gear stages each comprise a central or sun gear 20 for driving three planet gears 21, 22 and 23 mounted on a spider 24, as shown in FIGS. 6–8, for the first of the three gear stages. The sun gear 20 includes an axially extending hub $20^a$ and which hub $20^a$ is adapted to rotate with the driven shaft 14 by the provision of internally defined splines cooperating with the splined portion $14^a$ provided for the driven shaft 14 inwardly of the left hand end of the driven shaft 14; see FIG. 6. The end of the driven shaft 14 adjacent the splined portion $14^a$ is of a reduced diameter to receive a retaining collar 25 secured thereto by means such as a roll pin 26. The sun gear 20 is constantly urged inwardly towards the splined portion $14^a$ of the driven shaft 14 through the provision of a compression spring 27 arranged to be compressed between the collar 25 and the end of the sun gear hub $20^a$. The sun gear 20 is mounted in this fashion to be received centrally of the spider 24 to mesh in a driving relationship with each of the planet gears 20–23, as shown in FIG. 8.

The spider 24 for the first gear stage is centrally apertured to receive the sun gear 20 and which spider is further defined with three arms to receive the planet gears 21, 22 and 23 in a substantially triangular relationship with a portion of each of these planet gears extending outwardly of the spider 24. To this end the spider 24 is defined to receive the planet gears 21, 22 and 23 in an aperture arranged between the end faces thereof and to be in a meshing relationship with the sun gear 20, as is readily seen from viewing FIG. 8. The spider 24 is further arranged to mount the sun gear 30 for the second gear stage so as to be rotatable with the spider 24. The sun gear 20 is spaced on the shaft 14 from the sun gear 30 through the provision of a spacer such as by a fiber washer 31, shown mounted between the sun gears 20 and 30. The planet gears 21, 22 and 23 are each mounted on the spider 24 by means of an individual stub shaft such as the stub shaft 28 extending between the end faces of the spider 24 and also mounting a bearing 29 for the planet gear 21.

The second gear stage is similarly arranged with a spider 33 mounting three planet gears 34, 35 and 36 for the second stage and the sun gear 37 for the third and last stage of the gear train 13. The planet gears 34, 35 and 36 are arranged on the spider 33 in the same fashion as the planet gears 21–23 were arranged on the spider 24 for the first stage. Accordingly, the sun gear 30 mounted on the spider 24 is received by the spider 33 to mesh with each of the planet gears 34–36 to thereby drive the final sun gear 37. The sun gears 30 and 37 are spaced axially on the shaft 14 through the provision of a spacer 38 similar to the spacer 31. The sun gear 37 is mounted on the shaft 14 by means of a bushing 39 to permit the sun gear 37 to be freely rotatable about the shaft 14 in the same fashion that the sun gear 30 is rotatable about the shaft 14 through the provision of the bushing 40 therefor.

The third stage of the epicyclic gear train 13 is mounted in an assembly including a spider ring 41 for mounting the three planet gears 42, 43 and 44 with an end plate 45. The planet gears 42, 43 and 44 for the third gear stage are mounted by means of stub shafts as previously described, but in this instance, as shown for the shafts 46 and 47, they extend from the spider ring 41 to the end plate 45. The end plate 45 is in turn connected to the hoist drum 11 by fasteners such as bolts 48 to provide a driving connection to the hoist drum 11. The end plate 45 is journalled on the shaft 14 by means of a needle bearing 50 to allow it to rotate freely around same and thereby drive the hoist drum 11. The right hand extremity of the end plate 45 may be readily located on the shaft 14 through the provision of a collar 51 integral with the shaft 14 and against which the end plate 45 may be located in abutting relationship. The end plate 45 is shown in abutting relationship with an oil seal 49 arranged between the bearing 50 and the collar 51. The gear train 13 may now be seen to be located on the driven shaft 14 between the collar 25 and the collar 51 and is coextensive therewith, from the splined portion $14^a$.

The gear train 13 arranged and assembled in this fashion is mounted to be freely rotatable within the internal gear 12. To this end, the internal gear 12 is defined to mesh with each of the planet gears for the gear train 13, and more specifically with the above-mentioned portions of these planet gears extending from their spiders to mesh with the internal gear 12. The internal gear 12 is defined with a cup-shaped portion $12^a$ and an annular sleeve portion $12^b$. The cup-shaped portion $12^a$ has the gear teeth cut therein; see FIG. 9; and is coextensive with the three stages of the gear train 13. The closed end of the cup-shaped portion $12^a$ for the gear 12 is mounted at the hub $20^a$ for the sun gear 20 by means of a bearing 52 surrounding the hub $20^a$. The annular sleeve portion $12^b$ for the gear 12 is of a length to extend outwardly of the shaft 14 and the hoist drum 11. This sleeve portion $12^b$ is adapted to have the crank 17 connected thereto for manually rotating the internal gear 12. The bolts 48 connect a sleeve 53 to the drum 11 and which sleeve is spaced outwardly of the cup-shaped portion $12^a$ of gear 12 through the provision of an annular spacer 54 mounted on the sleeve portion $12^b$ against the wall of the cup-shaped portion $12^a$ of the gear 12. A bearing 57 is mounted on the flanged sleeve 53 outwardly of the flanged portion to permit the sleeve 53 to rotate in the bearing 57 and on the portion $12^b$ as a shaft to thereby cause the hoist drum 11 to rotate freely. The hoist drum 11 is provided with a spiral groove 55 defined inwardly of its ends to receive a lifting cable 56 having one end secured to the drum 11. The grooves 55 for the hoist drum 11 are of an increased depth from what is normally provided so as to allow the cable 56 to be readily and easily wound and unwound therefrom without any overlapping, pinching or damaging of the cable. The cable 56 may be a pre-formed aircraft tin-coated cable having a diameter of $\frac{5}{16}$ of an inch.

The brake 15 is mounted on the shaft 14 at the right hand end section, as shown in FIG. 6, in abutting relation with a collar 60 similar to the collar 51 and spaced outwardly therefrom. The brake 15 includes a pair of substantially circular brake discs 61 and 62 mountable on the shaft 14. The shaft 14 is provided with a splined portion $14^b$ adjacent the collar 60 to receive the brake disc 61 and which disc is provided with an internal spline at its hub $61^a$ so as to be connected to the splined portion $14^b$ for rotation with the shaft 14. The hub $61^a$ for the brake disc 61 is arranged against the collar 60 of the driven shaft 14. The brake discs 61 and 62 are substantially of the same general configuration except that the brake disc 62 includes an outward extension defined as a cam 63 integral therewith, as will be described more fully hereinafter.

The brake discs 61 and 62 are axially spaced on the shaft to clampingly receive a ratchet wheel 64 therebetween. The ratchet wheel 64 has its opposite side faces recessed inwardly of the peripheral edges thereof to receive a pair of substantially circular friction discs 65 and 66. The friction discs 65 and 66 are mounted on the ratchet wheel 64 to be flush therewith and to engage the faces of the brake discs 61 and 62 respectively. The ratchet wheel 64 is provided with a bushing 67 for mounting the wheel 64 on the shaft 14 to allow it to rotate freely around the shaft. The ratchet wheel 64 includes a restraining arm or dog 68 mounted to engage the teeth provided on the peripheral edge of the ratchet wheel 64, as best seen in FIG. 11. The restraining member 68 is arranged to allow the ratchet wheel 64 to rotate in a counter-clockwese direction while restraining the rotation of the wheel 64 in a clockwise direction. To this end the restraining arm 68 is mounted on a housing 70 for the brake 15 by means of a pin 71 adjacent one end of the restraining member 68. The restraining member 68 is urged constantly into engagement with the teeth of the ratchet wheel 64 through the provision of a flat spring 72 mounted in a cantilevered relationship with the housing 70.

The brake disc 62 is adapted to be mounted on shaft 14 to rotate freely about same through the provision of a bushing 73 mounted thereon. The right hand extremity of the shaft 14, as shown in FIG. 6, is splined at a portion 14c to receive a locking member or cam 74 and which cam is internally splined to be secured to the shaft 14 at the splined portion 14c. The brake disc cam 63 and the cam 74 are defined with camming surfaces which are both substantially of the same spiral configuration. The camming surfaces for both of the cams 63 and 74, shown in FIG. 12 for the cam 74, may be termed a one-sided square thread surface. The shaft 14 has its right-hand end provided with a threaded recess to receive a securing member 75 shown with a flat head to engage and secure the cam 74 from sliding outwardly from the shaft 14. An annular member 76 is secured to the brake disc 62 in driving relationship therewith so as to drive the shaft 14 through the brake 15. To this end the annular driving member 76 is of a cup-shaped configuration having a flange at one end connected to the brake disc 62 and a hub at the opposite end. The cup-shaped portion is provided with the journal member 77 internally thereof to receive the cam 74 so as to be freely rotatable. The hub portion of the annular driving member 76 is adapted to have the crank 16 mounted thereon for manually rotating same and thereby the shaft 14. The crank 16 is provided with a handle 78 to facilitate the rotating of the shaft 14. Also, the crank 16 may be provided with a ratchet 80 mounted to allow the shaft 14 to be rotated in small increments without going through a complete circular motion of the operating crank 16.

The entire brake 15 is mounted in the housing 70 and which housing is mounted on a bearing 81 which is in turn mounted on an outward extension of the end plate 45 surrounding the spacers 51 and 69. The housing 70 is adapted to seal the brake 15 by means of O rings such as the O ring 82 arranged adjacent the bearing 81 and outwardly of the stub shafts 46 and 47 by means of a spacer 83. The housing 70 is further sealed by means of another seal 84 mounted on the annular driving member 76, as shown in FIG. 6. The gear assembly 13 is arranged to rotate in a lubricating oil enclosed within the hoist drum 11 and the end plate 45 and sleeve 53. This arrangement is also suitably sealed to retain the lubricating oil therein and furthermore to keep out all dust, dirt, sand, moisture, and the like. Accordingly, the annular sleeve 53 is provided with O rings 86, 87 and 88 and an oil seal 89 while the plate 45 is provided with an O ring 97 in addition to the seal 49. The O ring 88 retains a thin film of oil lubricating the bearing surface between the sleeve 53 and the portion 12b and which oil film is insured through the provision of the oil holes 98 spaced on the portion 12b.

Figure 4:
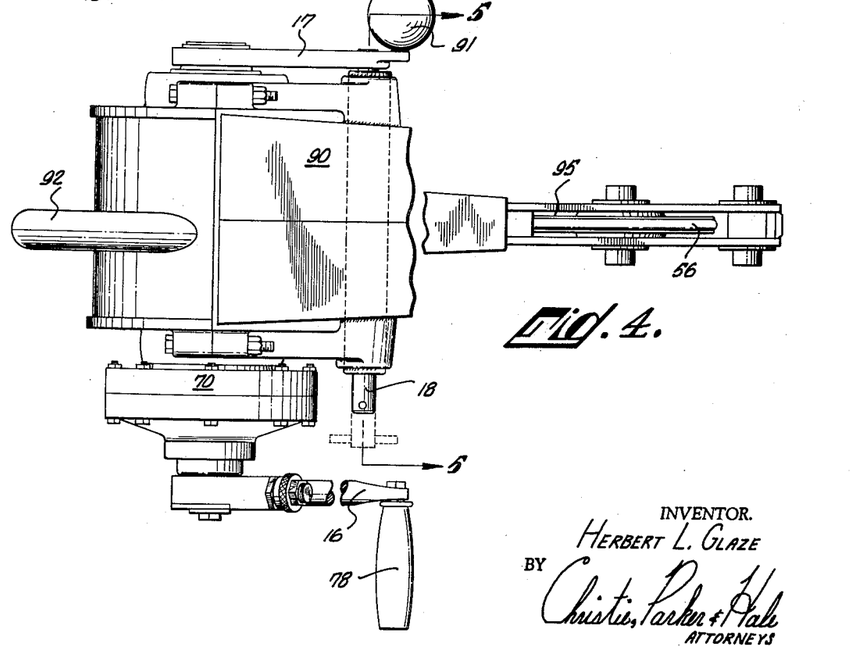
FIG. 4 is a plan view of the hoist of FIG. 3 with a portion of the boom broken away.

The control mechanism described hereinabove is provided with a housing 90 to enclose at least the hoist drum 11 in the manner shown in FIG. 4. It will be seen from examining FIG. 4 that the housing 70 for the brake 15 extends outwardly from this housing 90 as well as the crank 17 extending from the opposite end thereof. The crank 17 is shown provided with a knob 91 at the end thereof. Also, to facilitate the operation and the portability of the hoist 10, the housing 90 is shown with a handle 92 arranged to extend outwardly therefrom to provide a hand grip.

Figures 5, 10:
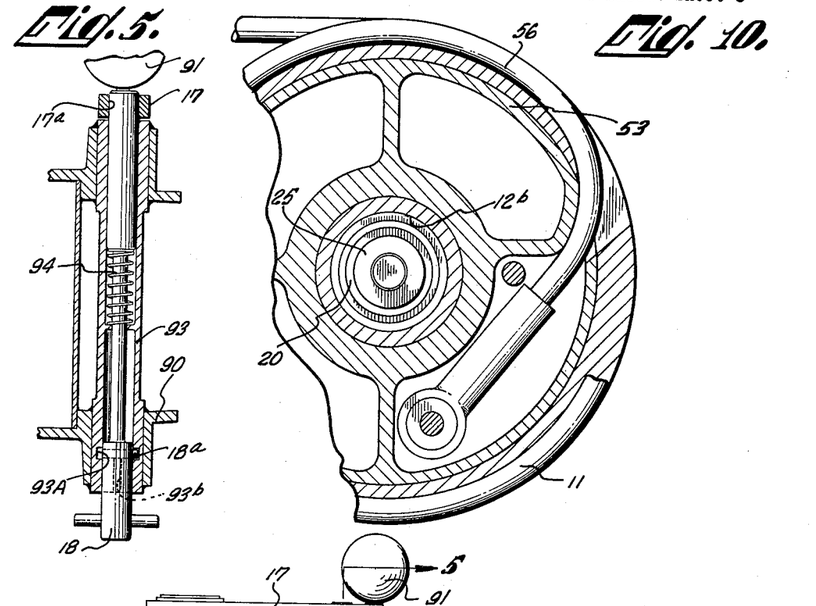
FIG. 5 is a cross-sectional view of the latch for the internal gear of the hoist taken along the line 5—5 of FIG. 4.
FIG. 10 is a partial sectional view of the hoist drum showing the lifting cable secured thereto.

An important feature of this invention is the provision of the control latch 18 for the crank 17 to lock and unlock the internal gear 12. The crank 17 is provided with a socket 17a arranged adjacent the handle 91 to receive one end of the control latch 18. The control latch 18 extends transversely of the housing 90, as shown in dotted outline in FIGS. 4 and 5, to lock the crank 17 in a stationary position through the provision of a latch tube 93 having a locking notch or annular groove 93a cooperating with a transverse latch pin 18a for the latch 18 engageable and disengageable therewith. The locking notch 93a is arranged adjacent the right hand end of the housing 90, as illustrated in FIG. 5. The latch 18 may be yieldingly urged into engagement with the crank 17 through the provision of a spring 94 surrounding the latch 18 and located intermediate its ends. It will now be appreciated that the locking of the crank 17 in a stationary position will in turn lock the internal gear 12 in a static condition. The crank 17 may be unlocked by turning the control latch 18 one-quarter of a turn in the groove 93a to disengage it from the latch tube 93 and through the provision of a channel 93b allow it to be withdrawn from the crank 17 against the spring 94 to an extended position against the end of the latch tube 93, as shown in dotted outline in FIG. 4.

The remainder of the housing 90 is arranged to house the boom for the roist 10 in a conventional fashion and is provided with a sheave 95 rotatably mounted adjacent one end of the boom to receive the free end of the lifting cable 56 from the hoist drum 11. The sheave 95 is arranged to suspend the free end of the cable 56 therefrom for connecting a load thereto to be raised and lowered as the cable 56 is wound on and unwound from the hoist drum 11.

With the above structure in mind, the operation of the improved hoist 10 will now be described. The description will first assume that the internal gear 12 is locked in a stationary position, that is, the control latch 18 is in engagement with the crank 17. It is therefore necessary to rotate the crank 16 by means of the handle 78 to drive the shaft 14 to wind or unwind the cable 56 from the hoisting drum 11. A counter-clockwise rotation of the crank 16 will raise any load secured to the lifting cable 56 and wind the cable on drum 11 while a clockwise rotation of the crank 16 will lower a load secured to the unwinding cable 56. The rotation of the crank 16 is effective to drive the shaft 14 through the driving action afforded by the driving member 76 secured to the brake discs 62. The brake disc 62 will now be seen to be effective through the cams 63 and 74 to drive the shaft 14. The shaft 14 will in turn rotate the sun gear 20 for the first stage of the gear train 13 and which sun gear 20 in turn rotates its associated planet gears 21, 22 and 23 operative for rotating the sun gear 30. In the same fashion the planet gears for the second gear stage are driven as well as the final sun gear 37 and its associated planet gears. The planet gears for the third stage are effective through the end plate 45 to drive the hoist drum 11 in the direction of rotation of the crank 16.

When a load is secured to the lifting cable 56 and the crank arm 16 is stopped, the tendency of the load to unwind the cable 56 from the hoist drum 11 is automatically arrested by means of the self-actuating brake 15. To this end under the influence of the inter-acting cams 63 and 74 on the shaft 14 and the outer brake disc 62, the ratchet wheel 64 is locked between the two friction discs 61 and 62 when the crank 16 is turned counterclockwise to raise the load on the cable 56. When the crank 16 is released and the load tends to rotate the shaft 14 clockwise it will thereby exert a positive grip on the ratchet wheel 64 sufficient to hold the load and prevent it from running away.

The hoist 10 of this invention has been constructed so that the gear train 13 will provide an overall gear reduction ratio of 85.184 to 1 to drive the hoisting drum 11. To achieve this large gear reduction each of the three epicyclic gear stages is arranged to have a ratio of 4.4 to 1. When the gear train 13 is arranged in this fashion, one turn of the crank 16 will overhaul the cable .245 inch.

This precise control arrangement, namely, the raising and lowering of a load through the gear train 13, can be overridden by unlatching the internal gear 12, as described hereinabove. This will allow the cable 56 to be wound on or unwound from the hoist drum 11 at a rapid rate since the drum 11 will then be directly driven through the internal gear 12.

When the crank 17 is unlatched it will positively drive the internal gear 12 and thereby cause the planetaries 21, 34, and 42 to roll around their respective sun gears 20, 30, and 37. With the rotation of the planetary 21 and its associated planetaries, the spider 24 will also be driven and thereby will rotate the sun gear 30 for the succeeding planetary stage or the stage including the planetaries 34 and 35. In the same fashion the sun gear 37 for these latter planetaries will be driven at a still higher rate by the revolution of the associated spider 33. The rotation of the planetaries 34 and 35 by the rotation of the spider 33 will be cumulative in that the rotation of these planetaries due to the internal gear 12 will be added to these rotations to produce a step-up in speed in the planetary stages. In the same fashion, the final planetary stage will be driven and which planetaries 42 and 43 are coupled to the flange 45 and will cause the drum to be rotated at a faster rate than the crank 17 as a result of the action of the planetary gearing system and thereby cause the cable 56 to be wound and unwound from the hoist drum 11 at a relatively rapid rate.

Figure 1:
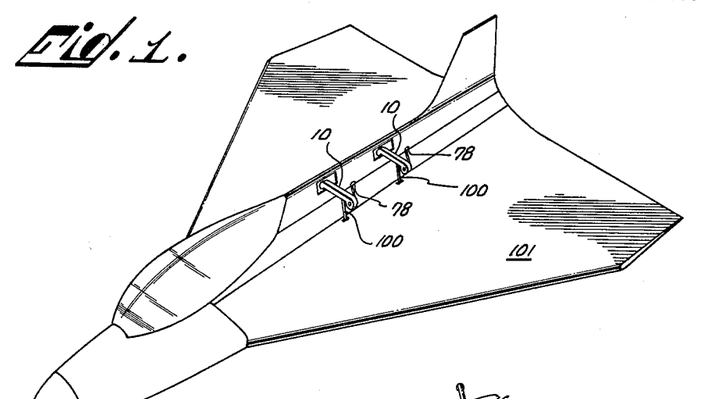
FIG. 1 is an elevational view of a jet aircraft showing the hoist of the invention mounted thereon for an assembly operation.
Figure 2:
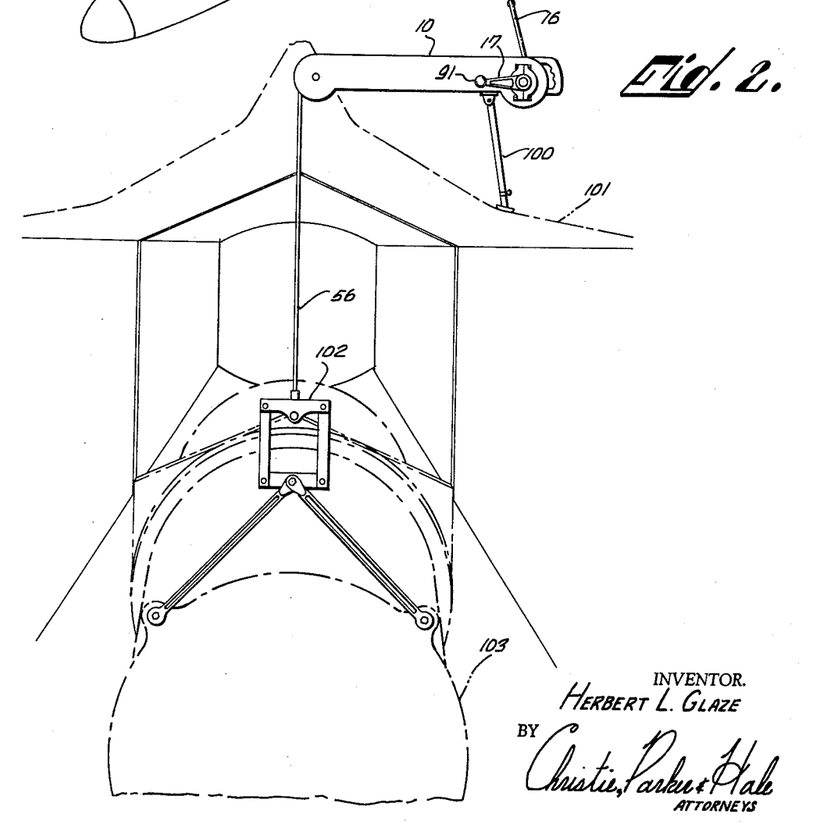
FIG. 2 is a partial view of the interior of the aircraft of FIG. 1 showing the hoist of this invention adapted for an assembly operation.
Figures 3, 12, 13:
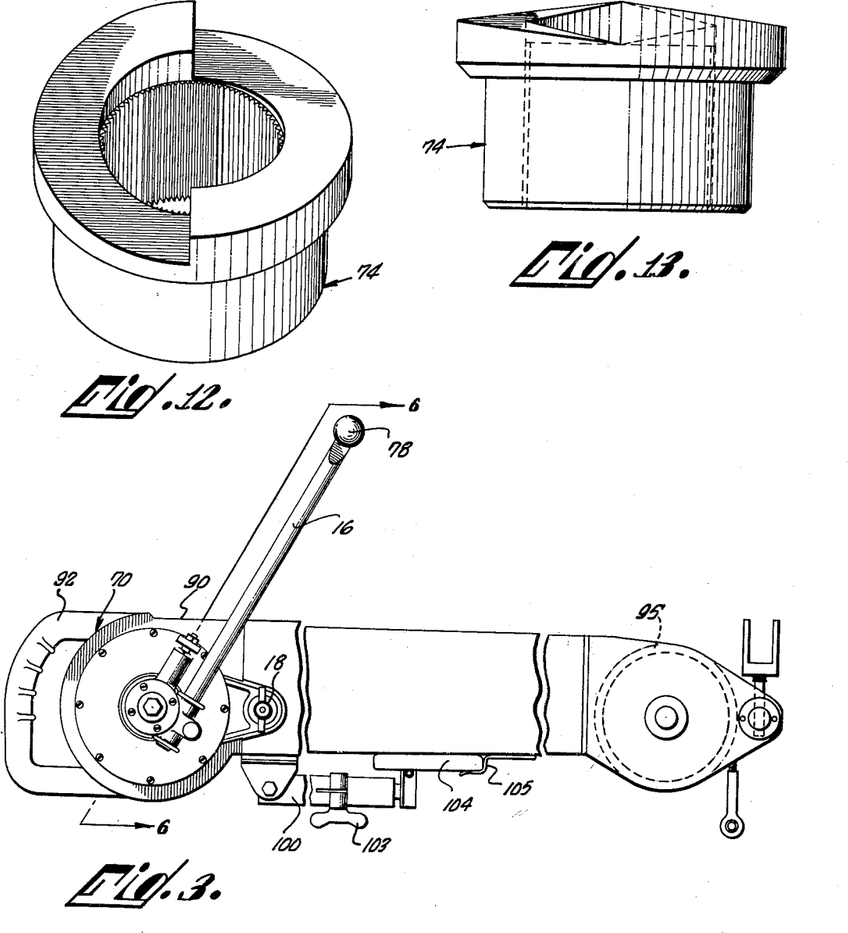
FIG. 3 is a side elevational view, with portions broken away, of a hoist embodying the invention.
FIGS. 12 and 13 are views of the detached brake cam.

The application of the hoist 10 shown in FIGS. 1 and 2 shows a pair of hoists 10 in FIG. 1 mounted by means of a single folding adjustable leg 100 that supports the hoists 10 on the wing of the jet aircraft 101. This leg 100 swings up for storage and swings down to support the hoist 10 on the wing of the plane. This leg 100 telescopes and is locked by the wing nut 103 shown. A universally mounted, hinged pad or foot 104 is provided as shown in FIG. 3, which shows the hinged pad 104 flat against the bottom of the boom, restrained under a bracket 105 and locked in position by the wing nut 103. The pad 104 is covered with a soft plastic cushion to protect the skin of the plane. When mounted in this fashion the operator's hands are free to operate the hoist. The hoist 10 shown in FIG. 2 mounted on the aircraft 101 has an adapter including the portion identified by reference number 102 particularly constructed to lift a jet engine 103 and which adapter 102 is connected to the end of the lifting cable 56. Other adapter parts are provided at the trap doors of the plane to receive the lugs shown projecting at either side of the sheave axle and at the ends of the sheave axle and at the end of the boom beyond the sheave. The crank 16 can now be rotated to precisely locate the engine 103 with respect to aircraft 101 or the engine 103 may be located by manipulating the arm 16 through the ratchet 80 therefor, whichever is most convenient for the operator.

Although this invention has been described in conjunction with jet engine installation, it may also be utilized for the removal of jet engines from the aircraft as well as for cargo handling, bomb hoists, missile handling, ammunition loading or any other type of application where a precise control over the load is required.

The hoist of this invention has been constructed in accordance with the above-described specification to have a weight of 69 pounds and a working load capacity of 4,000 pounds with an ultimate load of 7,000 pounds. The cable 56 is arranged to have a lift of ten feet with two wraps of the cable remaining on the hoisting drum 11.

What is claimed is:

1. In a hoist including an elongated driven shaft, an epicyclic reduction gear train having a plurality of stages mounted on said shaft to be rotatable therewith, a cup shaped internal gear mounted on said shaft for rotation relative to said shaft and arranged in meshing relationship with each stage of said gear train, a hoist drum having a lifting cable adapted to be wound thereon and unwound therefrom in response to the rotation of said drum and spaced from said internal gear and arranged to completely house said internal gear and said gear train, means for connecting the slowest stage of said gear train to said drum to slowly drive said drum only when said internal gear is held stationary, means for selectively holding said internal gear in a stationary position relative to said shaft, manual means mounted on said internal gear for rotating same and thereby the gear train when it is not held in a stationary position, a self-actuating brake comprising a housing, a pair of substantially circular brake discs arranged in said housing and mounted on said driven shaft at an end opposite from said manual means, one of said discs being mounted on said shaft to be rotatable therewith and the other disc being mounted on said shaft to freely rotate about same, said other disc including a substantially central cam defined to extend outwardly thereof, a substantially similar cam defined to lockably engage the cam of said disc for automatically actuating the brake in response to the unwinding of the lifting cable caused by the driving action of a load attached to the cable and mounted on said shaft for rotation therewith, a ratchet wheel adapted for frictional driving engagement with said discs, and a restraining member for said ratchet wheel secured to said housing and yieldably engaging said ratchet wheel to permit the wheel to rotate in only one direction, and manual means connected to said rotatable disc for rotating said shaft.

2. In a hoist as defined in claim 1 wherein said cams are defined with one-sided square threads and said ratchet wheel is recessed on opposite sides thereof to receive a pair of friction discs therein.

3. In a hoist including a drum, a driving shaft for said drum arranged coaxially therewith and extending outwardly thereof, an internal gear mounted on said shaft to freely rotate about said shaft and housed within said drum, a gear train including a gear fixed to said shaft to be rotatable therewith to drive the remaining gears of said gear train and having a driving connection with said drum, said gear train being arranged to rotate within said internal gear and drive said drum when the internal gear is locked, means for locking and unlocking said internal gear in non-rotatable and rotatable positions, respectively, relative to said drum, means connected to said shaft for rotating same and thereby rotate the drum through said gear train when said internal gear is locked, means for driving said internal gear when it is unlocked for driving said drum through said gear train, and a one-way brake assembly arranged on said driving shaft inwardly of said means for rotating same, said brake comprising a pair of braking discs mounted on said driving shaft, one of said discs being mounted on said shaft to be rotatable therewith while the other disc is freely rotatable thereon, said other discs including an outward extension, and a member mounted for rotation with said shaft and in driving engagement with said disc extension, said shaft rotating means being connected to said other disc for rotating said shaft through said brake.

4. In a hoist as defined in claim 3 wherein said gear train comprises an epicyclic reduction gear train having a plurality of stages axially mounted on said shaft to be rotatable therewith and within said internal gear.

References Cited in the file of this patent

UNITED STATES PATENTS

| | | |
|---|---|---|
| 702,834 | Votsch | June 17, 1902 |
| 767,742 | Ferguson et al. | Aug. 16, 1904 |
| 2,406,156 | Nardone | Aug. 20, 1946 |
| 2,435,353 | Hite | Feb. 3, 1948 |
| 2,495,804 | Berchtold | Jan. 31, 1950 |
| 2,621,541 | Rath | Dec. 16, 1952 |
| 2,668,036 | Klemm | Feb. 2, 1954 |
| 2,701,973 | Mackmann | Feb. 15, 1955 |
| 2,727,604 | Robertson | Dec. 20, 1955 |

FOREIGN PATENTS

| | | |
|---|---|---|
| 113,413 | Switzerland | Jan. 2, 1926 |
| 6,493 | Great Britain | of 1908 |